(12) United States Patent
Heinken et al.

(10) Patent No.: US 10,551,236 B2
(45) Date of Patent: Feb. 4, 2020

(54) METHOD FOR DETERMINING AN AIR VOLUME IN A COMBUSTION CHAMBER OF AN INTERNAL COMBUSTION ENGINE

(71) Applicant: Volkswagen Aktiengesellschaft, Wolfsburg (DE)

(72) Inventors: Sebastian Heinken, Braunschweig (DE); Kirsten Pankratz, Braunschweig (DE); Lars Petersen, Meinersen (DE); Andre Shurkewitsch, Calberlah (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 141 days.

(21) Appl. No.: 15/920,833

(22) Filed: Mar. 14, 2018

(65) Prior Publication Data
US 2018/0266871 A1    Sep. 20, 2018

(30) Foreign Application Priority Data

Mar. 17, 2017    (DE) .......................... 10 2017 105 853

(51) Int. Cl.
*G01M 15/04*    (2006.01)
*G01F 22/02*    (2006.01)
(Continued)

(52) U.S. Cl.
CPC .............. *G01F 22/02* (2013.01); *F02D 33/02* (2013.01); *G01M 15/05* (2013.01)

(58) Field of Classification Search
CPC .................................................. G01M 15/04
(Continued)

(56) References Cited

U.S. PATENT DOCUMENTS 6,170,475 B1    1/2001    Lewis et al.
6,363,316 B1    3/2002    Soliman et al.
(Continued)

FOREIGN PATENT DOCUMENTS

DE    100 06 127 A1    9/2000
DE    101 22 456 A1    11/2001
DE    10 2005 059 436 A1    6/2007

OTHER PUBLICATIONS

Extended Search Report for European Patent Application No. 1 816 1649.1, dated Aug. 1, 2018.
(Continued)

*Primary Examiner* — Eric S. McCall
(74) *Attorney, Agent, or Firm* — Pearl Cohen Zedek Latzer Baratz LLP

(57) ABSTRACT

A method for determining an air volume in a combustion chamber of a fuel-injection internal combustion engine, especially during a load change condition, including synchronizing a throttle valve setpoint signal to an operating state criterion ($t_n$); determining a curve dynamics of the throttle valve position taking into account the synchronized throttle valve setpoint signal; determining an actual air volume quantity at an ACTUAL time point ($t_0$); determining a desired time point ($t_0+\Delta t$); predicting a further air volume quantity for the desired time point ($t_0+\Delta t$) and determining a total air volume quantity from the ACTUAL air volume quantity and the further air volume quantity for the desired time point ($t_0+\Delta t$).

10 Claims, 4 Drawing Sheets

(51) Int. Cl.
*F02D 33/02* (2006.01)
*G01M 15/05* (2006.01)

(58) Field of Classification Search
USPC ............... 73/114.31, 114.32, 114.33, 114.36, 73/114.37
See application file for complete search history.

(56) References Cited

U.S. PATENT DOCUMENTS

| 6,460,409 B1 | 10/2002 | Soliman et al. | |
|---|---|---|---|
| 2007/0295067 A1 | 12/2007 | Rollinger et al. | |
| 2015/0040652 A1* | 2/2015 | Wakao | F02D 41/009 73/114.32 |
| 2017/0016407 A1* | 1/2017 | Whitney | F02D 35/024 |

OTHER PUBLICATIONS

Search report for German Patent Application No. 10 2017 105 853.2, dated Aug. 31, 2017.

* cited by examiner

METHOD FOR DETERMINING AN AIR VOLUME IN A COMBUSTION CHAMBER OF AN INTERNAL COMBUSTION ENGINE

CROSS-REFERENCE TO RELATED APPLICATIONS

This application claims the benefit of German Patent Application No. 10 2107 105 853.2, filed Mar. 17, 2017, which is herein incorporated by reference in its entirety.

FIELD OF THE INVENTION

The present invention relates to a method for determining an air volume in a combustion chamber of an internal combustion engine, especially a direct-injection spark ignition engine. The present invention also relates to an internal combustion engine having a control that is adapted for implementing such a method. The present invention also relates to a vehicle having such an internal combustion engine.

BACKGROUND OF THE INVENTION

In internal combustion engines and especially spark ignition engines, the fuel quantity supplied for combustion is adjusted as a function of an inducted air mass (air volume). The supplied air volume is controlled by what is commonly known as the throttle valve, which is controlled directly or via a control as a function of the gas pedal position (driver's desired torque). A desired air charge in the combustion chamber, from which a desired throttle valve position is determined and is then adjusted to the desired position by a controller, corresponds to the gas pedal position. The resulting air volume in the combustion chamber (of a cylinder) of the internal combustion engine is adjusted via sensors and suitable control methods.

For each combustion cycle, the existing air mass (in the combustion chamber) is determined by charge sensing.

In a charge sensing system, what is referred to as the α-n system, the fresh-air flow rate is determined via a characteristics map as a function of the throttle-valve angle α and speed n and is then converted into an actual air-mass flow.

Via a control model (for example, a throttle valve model) with the aid of the pressure drop across the throttle valve, as well as the temperatures in the intake manifold, and with the aid of the throttle-valve angle, the air-mass flow is calculated in what is referred to as the p-n system. The inducted fresh air (air volume in the combustion chamber) is thereby computed taking into account engine speed n, pressure p in the intake manifold (upstream of the intake valve), the temperature in the intake port, and other influences (camshaft control and valve stroke control, intake-manifold switchover, position of the charge-turbulence flaps).

A further method employs a hot-film air-mass meter (HFM) that determines the air mass flow streaming into the intake manifold.

However, only during steady-state engine operation, do the α-n system and the HFM system, which each determine only the mass flow streaming through the intake manifold, provide a valid value for the actual cylinder charge or, respectively, for the air volume that is available for the combustion. In response to a load change, i.e., a sudden change in the throttle-valve angle, the mass flow in the intake manifold changes immediately, while the mass flow entering into the cylinder (combustion chamber) and thus the cylinder charge only changes in response to an increase or decrease in the intake manifold pressure.

To correctly determine the charge influencing quantities over time, conventional approaches for determining the air mass during load change are based on the load build-up and reduction (load change) dynamics being retarded (delay of the throttle valve adjustment) to still be able to determine the air volume accurately enough. However, such a delay in throttle valve movement leads to a slower load build-up (or load reduction) of the vehicle and thus to an unwanted, reduced load change dynamics.

There are other approaches for offsetting this reduced dynamics—especially upon acceleration—by compensating for the inaccurately computed air volume by injecting fuel multiple times. However, this requires complex modifications in the injection control system.

Another problem is that the actual air charge in the combustion chamber is not established until after the intake valve is closed. At that time point, however, to ensure an efficient mixing of the air-fuel mixture, fuel is no longer being injected into the combustion chamber itself (direct injection) or into the intake manifold (manifold injection). In manifold injection, the injection can even be already ended before the intake valve opens at all.

To overcome this problem in intake manifold injection systems, the German Patent Application DE 10 2005 059 436 A1 describes an approach for predicting the actual air charge in the combustion chamber. In this regard, using a pressure gradient in the manifold and predicted throttle valve positions, the approach provides for computing the manifold pressure at the instant of intake valve closing and consequently a predicted air charge in a plurality of stages.

A refined manifold injection system approach is based on using the position controller of the throttle valve to acquire an actual quantity (actual air charge) from a setpoint variable (desired air charge). During dynamic operation (in the case of a load change), a setpoint variable in advance of an actual quantity is thereby used for predicting the actual quantity. Attenuation and retardation are used to convert the leading signal into a lagging signal. However, when working with internal mixture formation (in the case of direct injection), accurate fuel metering requires that the air volume contained in the combustion chamber be determined as exactly as possible prior to the actual injection, to make possible a high load change dynamics.

SUMMARY OF THE INVENTION

This objective is achieved by the inventive method in accordance with the claims and the internal combustion engine in accordance with the claims.

Further advantageous embodiments of the present invention will become apparent from the dependent claims and from the following description of preferred exemplary embodiments of the present invention.

The method according to the present invention for determining an air volume in a combustion chamber of a fuel-injection internal combustion engine, especially during a load change condition, is distinguished by the following steps:
  synchronizing a throttle valve setpoint signal to an operating state criterion;
  determining a curve dynamics of the throttle valve position taking into account the synchronized throttle valve setpoint signal;
  determining an actual air volume quantity (manifold pressure) at an actual time point;

determining a desired time point that follows the actual time point;

predicting another air volume quantity for the desired time point; and determining a total air volume quantity from the actual air volume quantity and from the further air volume quantity for the desired time point.

Synchronizing the throttle valve setpoint signal derived from a driver command (accelerator pedal position) to an operating state criterion makes possible a better adaptation to the operating state and, accordingly, to the engine cycle. On the one hand, the setpoint signal is temporally advanced to a corresponding accelerator pedal position signal, thereby reducing the delay between these two signals. At the same time, the setpoint signal is synchronized to the operating state of the internal combustion engine, making it possible for the setpoint signal to always be considered in a desired time relation to a specific engine cycle.

An actual curve dynamics of the throttle valve position is determined on that basis, taking into account the synchronized throttle valve setpoint signal. This curve dynamics is then likewise always synchronized to the operating state criterion, thereby enabling it to likewise be "in step" with the engine during the later control engineering consideration.

To actually determine the air volume, an actual air volume quantity is then initially determined at actual time point $t_0$. Starting from this time point $t_0$, a subsequent desired time point $t_0+\Delta t$ is determined. The desired time point is thereby the time point for which the relevant air volume quantity is to be determined. However, this time point is still in the future relative to determination time point $t_0$ (actual time point). For that reason, another air volume quantity for the desired time point is predicted in the next step, and the total air volume quantity is subsequently determined from the actual air volume quantity and the further air volume quantity for the desired time point (for example, the point of injection). This method eliminates the need for delaying a throttle valve actuator during load change operation (also transient operation) to realize a maximum dynamics during load reduction or build-up. Synchronization and the combined determination of the air volume from an actual air volume and another (predicted) air volume quantity make it possible to determine the air volume in the combustion chamber with a sufficient degree of accuracy. Depending on the available computing capacity, the accuracy may be readily scaled by the prediction step taking into account a scalable discretization of the throttle valve-position curve dynamics. The method may be readily combined with known methods and especially with the p-n, respectively HFM system.

There are methods that provide that the operating state criterion, to which the throttle valve setpoint signal is synchronized, include a crankshaft position and/or a valve position, especially an intake valve position. The intake valve position is especially important for the air volume that is available in the combustion chamber.

There are methods that provide that the actual air volume quantity include measuring a manifold pressure $p_{SR}$ and/or an air mass flow $m_{SR}$. Both measured quantities are directly associated with the air volume that flows into the combustion chamber. As is very readily and quickly ascertainable, it is beneficial to use the manifold pressure. It is, therefore, advantageous for the dynamic calculations that are desirable for determining the air volume in a process that is exactly timed to the cylinder.

There are methods that provide that predicting the further air volume include predicting a throttle valve position at a first and a second prediction time point $t_1$ and $t_2$, predicting a first air volume quantity at the first prediction time point, predicting at least one second air volume quantity at the second prediction time point, and determining the further air volume quantity from the first and second air volume quantity on the basis of a tank model.

Since system inertias prevent the throttle valve setpoint (in the ideal case, a step function) from conforming to the actual throttle valve curve, the prediction is improved by predicting the actual throttle valve position at at least two discrete points (for example, using a throttle valve model that is mapped in terms of control engineering) and also by determining a first and a second air volume quantity at these prediction time points, respectively. With the aid of a tank model that maps or models the combustion chamber (or the relevant filling space), it is possible to determine the further (predicted) air volume quantity from this first and second or, however, from a plurality of air volume quantities. The accuracy of the modeling component (predicted component) is thus significantly enhanced.

The further air volume quantity may thereby be a predicted pressure difference and/or a predicted air-mass flow difference.

There are methods that provide that the tank model map a combustion chamber and/or an injection chamber of the spark ignition engine at the prediction time point. In the case of external mixture formation (system having manifold injection), the manifold—cylinder—combustion chamber system is to be taken into account; while, in the case of internal mixture formation (direct injection system), the combustion chamber of the cylinder at the injection time point is to be modelled.

There are methods that provide that the further air volume quantity be predicted by taking into account a characteristics map having fixed and/or variable data, a calculation algorithm, and/or operating state quantities of the spark ignition engine. Thus, for example, the prediction values may be adapted to the operating state of the engine (the discretization intervals for determining the predicted air volume quantities may thereby be reduced in response to increasing speed, for example, or also increased in response to decreasing speed).

Thus, upon completion of the load change in a steady-state operation, it is also possible to entirely determine the air volume without a prediction component.

There are methods that provide that the desired time point and/or the prediction time point be determined by taking a speed-dependent time difference into account.

There are methods that provide that the air volume be determined for a direct fuel-injection combustion chamber. The above described inventive method is especially suited for direct-injection internal mixture formation since it is hardly possible to measure the actual air volume in the actual combustion chamber. For that reason, the prediction component is especially significant and helpful in determining the air volume.

An internal combustion engine having a control that is adapted for implementing a method in the above described manner permits a high load change dynamics without having to thereby accept the disadvantages of an inaccurate fuel measurement. It is, rather, possible to realize advantages such as consumption optimization, pollutant optimization, and reduction of engine misfiring.

BRIEF DESCRIPTION OF THE DRAWINGS

Exemplary embodiments of present invention will be described exemplarily and with reference to the attached drawing, in which.

DETAILED DESCRIPTION OF THE INVENTION

Figure 1:
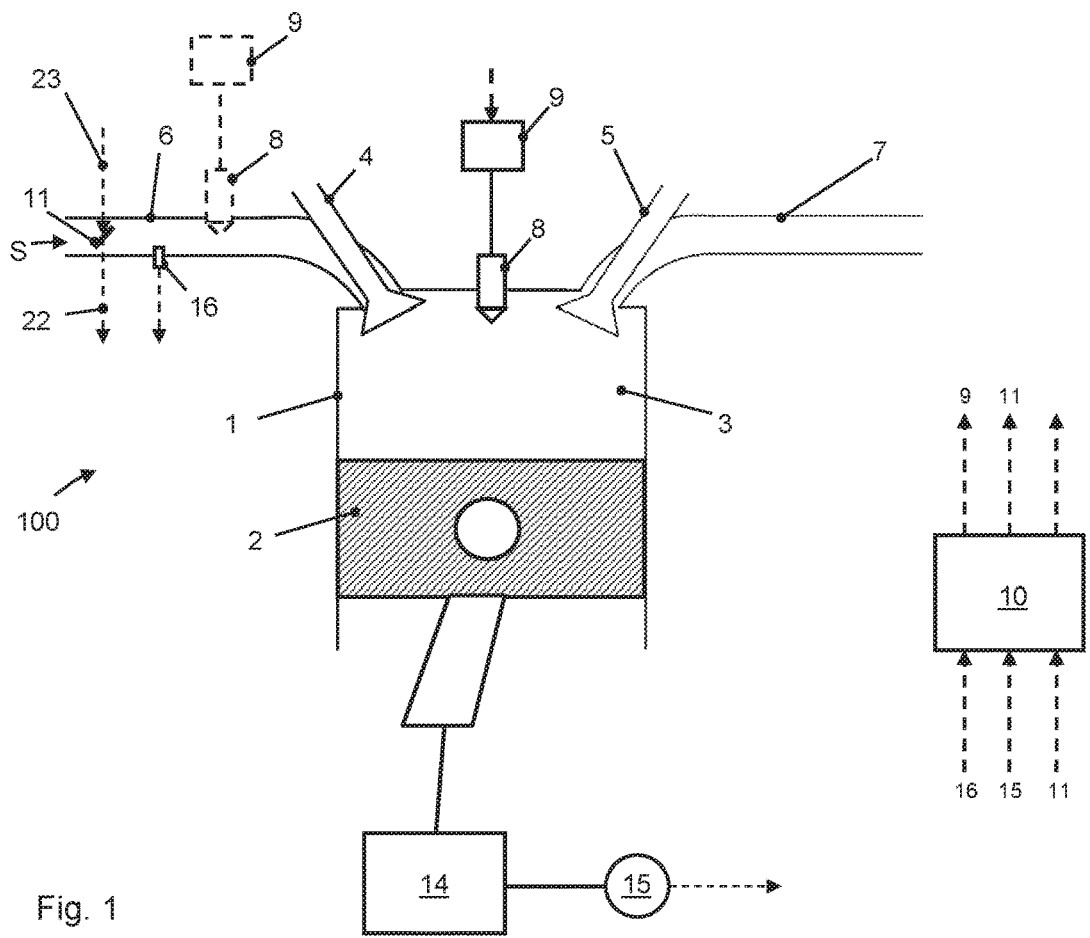
FIG. 1 shows an internal combustion engine 100 that is suited for implementing the method according to the present invention.

FIG. 1 schematically shows an internal combustion engine 100 having internal mixture formation (direct injection) and, alternatively, external mixture formation (manifold injection, dashed line representation). Shown is one of a plurality of cylinders 1 having piston 2 that define combustion chamber 3. Combustion chamber 3 is optionally sealed by an intake valve 4 or an exhaust valve 5 or communicates with intake manifold 6 or with exhaust pipe 7.

Fuel injection motor 8, which is actuated by an actuating element 9 and injects fuel directly into the combustion chamber, leads into combustion chamber 3. For that purpose, actuating element 9 receives control signals from an engine management 10.

Optionally, fuel injection motor 8, together with actuating element 9, may also lead into intake manifold 6 (dashed line representation). It is then a question of an engine 100 having external mixture formation and manifold injection.

Configured in intake manifold 6 is throttle valve 11 which receives control signals 12 via engine management 10 and emits position signals 13. Throttle valve 11 thereby regulates air-mass flow S that is directed by intake manifold 6 into combustion chamber 3. The piston movement produced by the combustion is taken up by crankshaft 14, and a speed sensor 15 transmits engine speed n to engine management 10. A detector 16 in the form of a pressure sensor and/or mass-flow sensor senses intake manifold pressure $p_{SR}$ or an air-mass flow $m_{SR}$ and likewise supplies it as a signal indicative thereof to engine management unit 10.

Figure 2:
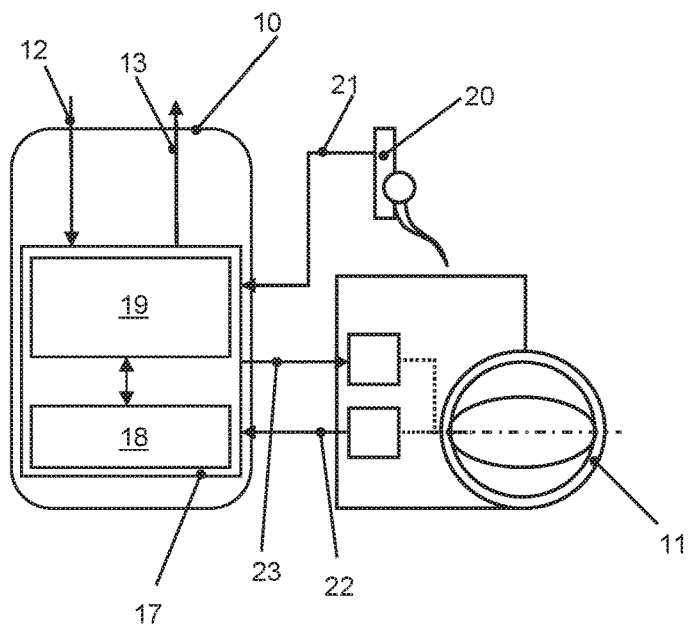
FIG. 2 schematically represents an electronic engine-power control for the internal combustion engine shown in FIG. 1 for implementing the method according to the present invention.

FIG. 2 clarifies the control of throttle valve 11. Engine management 10 includes a controller unit 17 having a monitoring module 18 and a processing unit 19. Unit 17 receives signals from sensors and transmits signals to actuators. Thus, for example, an accelerator pedal module 20 emits position signal 21 of an accelerator pedal position, and controller unit 17 processes the same, thereby transmitting a throttle valve actuating signal 23 to throttle valve 11 which, in turn, transmits a position signal 22 to unit 17. Thus, controller unit 17 of engine management 10 adjusts and monitors the throttle valve position.

Figure 3:
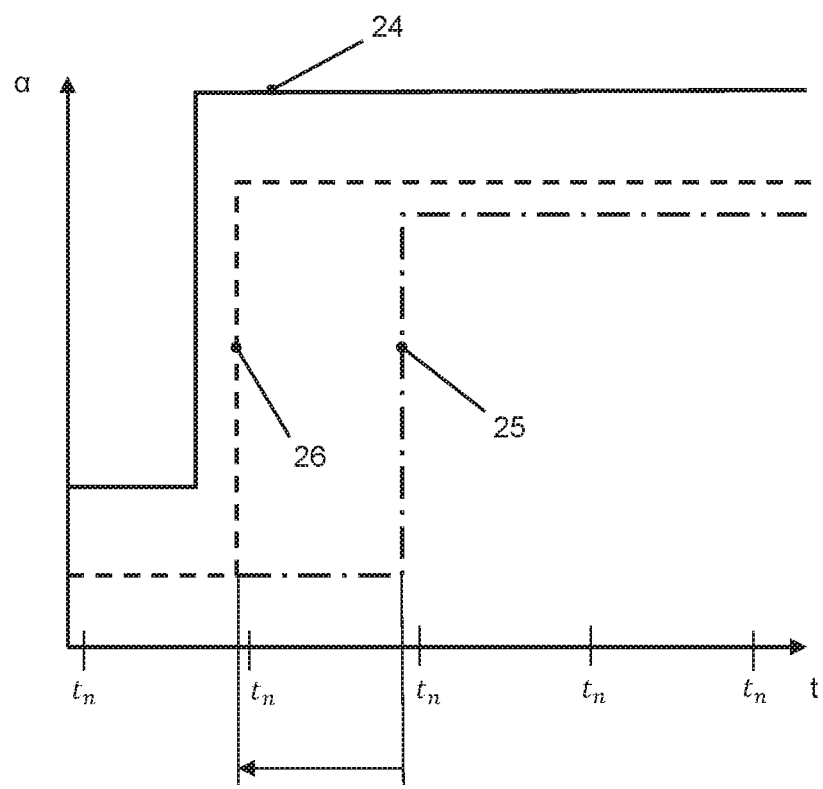
FIG. 3 is a diagram that schematically clarifies the synchronization step of the method according to the present invention.

The method according to the present invention includes important sub-steps:

FIG. 3 shows a synchronization step where the diagram illustrates the following signal characteristics over time t: a curve of accelerator pedal position 24, which characterizes a driver command, and a throttle valve setpoint signal 25 (original), which follows from the curve of the accelerator pedal position—in each case, plotted as angle α. Illustrated on time axis in each case are time points $t_n$, which characterize the beginning of an intake stroke, respectively. In the method, original throttle valve setpoint signal 25 is advanced in time (direction of arrow), so that it is immediately before a time point $t_n$ of an intake cycle. This synchronized or timed throttle valve setpoint signal 26 is used for the remainder of the method.

Figure 4:
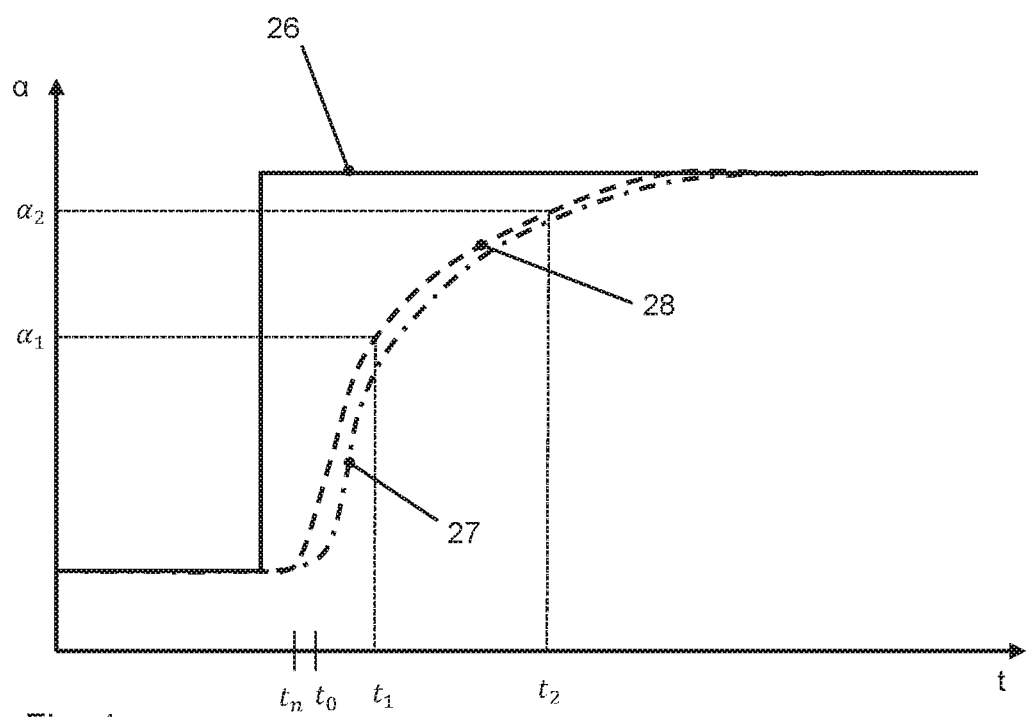
FIG. 4 is a diagram that schematically illustrates the modeling step of a curve dynamics of the throttle valve position.

For this, FIG. 4 shows a modeling of the actual throttle valve position curve (throttle dynamics) that is to be derived from synchronized throttle valve setpoint curve 26. Due to inertias in the system, the actual throttle valve curve is indicated in the diagram by curve 27 that deviates from throttle valve setpoint curve 26. In a calculation method or with the aid of characteristic data, a throttle valve curve 28 is then modeled (dashed line representation), which is used for further calculations. With the aid of modeled throttle valve curve 28, throttle valve positions (opening angles $α_1$ and $α_2$) may be determined at specific time points $t_1$ and $t_2$ (different opening angles of the throttle valve and thus different pressure curves across the throttle valve).

Figure 5:
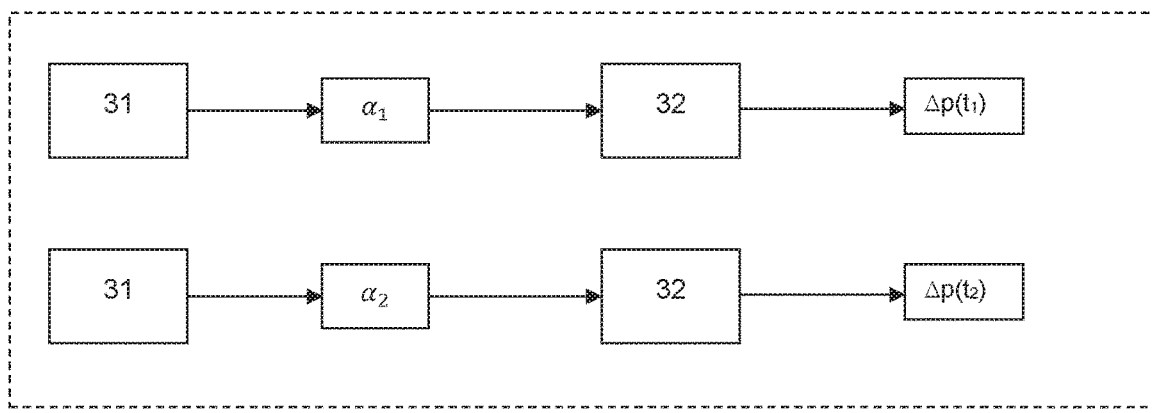
FIG. 5 is a schematic representation of the prediction of another air volume quantity.

FIG. 5 shows the method sequence where, in a first step, with the aid of a throttle valve model, throttle valve position at is determined. It then leads in a pressure tank model 32 to a prediction pressure $Δp(t_1)$. This is likewise determined in a next step at a time point $t_2$ for a second throttle valve position $α_2$. $Δp(t_2)$ results here. It likewise corresponds to a predicted pressure value.

Figure 6:
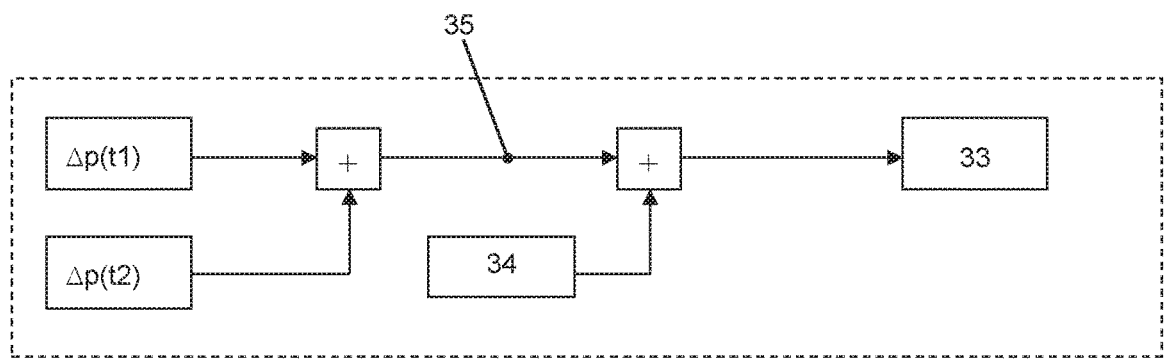
FIG. 6 is a schematic representation of the discrete determination of a first and second air volume quantity.

FIG. 6 shows the determination of a total air volume quantity 33 that results from predicted pressure variables $Δp(t_1)$ and $Δp(t_2)$, as well as from an actual air volume quantity 34 (here, ACTUAL pressure $p_{ACTUAL}$) that is determined with the aid of detector 16. Pressure variables $Δp(t_1)$, $Δp(t_2)$ and $p_{ACTUAL}$ are thereby summed.

Figure 7:
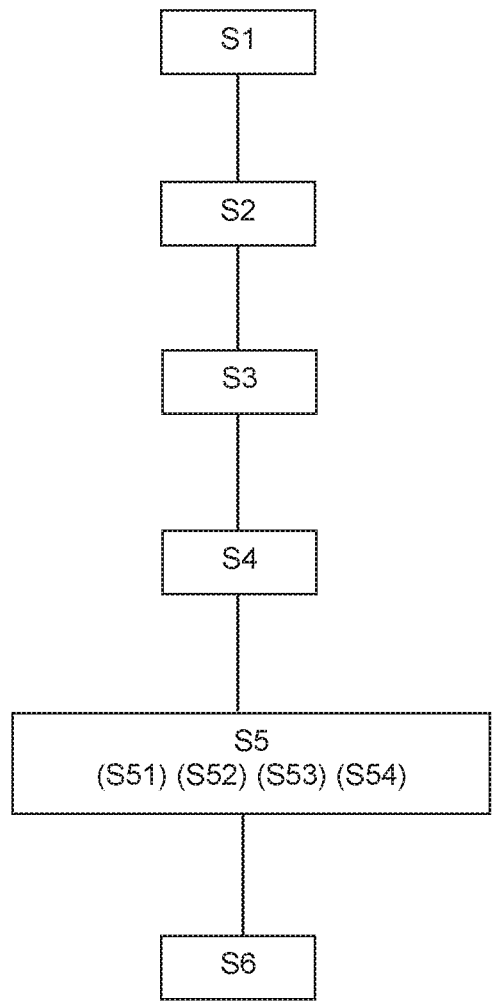
FIG. 7 is a schematic flow chart of the method according to the present invention.

FIG. 7 shows an exemplary embodiment of the entire inventive method sequence including the steps:

S1 synchronizing a throttle valve setpoint signal 25, 26 to an operating state criterion $t_n$ (for example, intake stroke of the next cylinder/crankshaft position);

S2 determining/modeling a curve dynamics 28 of the throttle valve position taking into account the synchronized throttle valve setpoint signal 26;

S3 determining an actual air volume quantity ($p_{sr}$) 34 at an ACTUAL time point $t_0$;

S4 determining a desired time point $t_0+Δt$;

S5 predicting another air volume quantity (Δp, Δm) for the desired time point ($t_0+Δt$);

S6 determining a total air volume quantity 33 from the ACTUAL air volume quantity 34 and the further air volume quantity for the desired time point ($t_0+Δt$).

Step S5 may thereby include other optional steps (entered in parentheses in the figure):

S51 predicting a throttle valve position $α_1$; $α_2$ at a first and a second prediction time point $t_1$; $t_2$;

S52 predicting a first air volume quantity $Δp(t_1)$ at first prediction time point $t_1$;

S53 predicting at least one second air volume quantity $Δp(t_1)$ at second prediction time point $t_2$;

S54 determining the further air volume quantity on the basis of a tank model 32.

Other variations and exemplary embodiments of the present invention will become apparent to one skilled in the art from the claims.

LIST OF REFERENCE NUMERALS 100 combustion engine
1 cylinder
2 piston
3 combustion chamber
4 intake valve
5 exhaust valve
6 intake manifold
7 exhaust pipe
8 fuel injection motor
9 actuating element
10 engine management/engine management unit
11 throttle valve
12 control signal
13 actuating signals
14 crankshaft
15 speed sensor
16 detector
17 controller unit
18 monitoring module
19 processing unit
20 accelerator pedal module
21 position signal
22 throttle valve position signal
23 throttle valve actuating signal
24 curve of the accelerator pedal position
25 original throttle valve setpoint signal
26 synchronized throttle valve setpoint signal
27 real throttle valve curve
28 modeled throttle valve position curve
31 throttle valve model
32 pressure tank model
33 total air volume quantity
34 actual air volume quantity ($P_{SR}$; $m_{SR}$)
35 further air volume quantity
$t_0$ actual time point
$T_0+\Delta t$ desired time point
$t_n$ operating state criterion
$t_1$; $t_2$ prediction time point
$\alpha_1$; $\alpha_2$ throttle valve position

The invention claimed is:

1. A method for determining an air volume in a combustion chamber of a fuel-injection internal combustion engine during a load change condition, comprising:
synchronizing a throttle valve setpoint signal to an operating state criterion ($t_n$);
determining a curve dynamics of the throttle valve position taking into account the synchronized throttle valve setpoint signal;
determining an actual air volume quantity at an ACTUAL time point ($t_0$);
determining a desired time point ($t_0+\Delta t$);
predicting another air volume quantity for the desired time point ($t_0+\Delta t$); determining a total air volume quantity from the ACTUAL air volume quantity and the further air volume quantity for the desired time point ($t_0+\Delta t$).

2. The method as recited in claim 1, wherein the operating state criterion ($t_n$) includes a crankshaft position and/or an intake valve position.

3. The method as recited in claim 1, further comprising determining the actual air volume quantity including measuring a manifold pressure ($p_{SR}$) and/or an air mass flow ($m_{SR}$).

4. The method as recited in claim 1, wherein predicting another air volume quantity includes:
predicting a throttle valve position ($\alpha_1$, $\alpha_2$) at a first and a second prediction time point ($t_1$; $t_2$);
predicting a first air volume quantity ($\Delta p(t_1)$) at the first prediction time point ($t_1$);
predicting at least one second air volume quantity ($\Delta p(t_2)$) at the second prediction time point ($t_2$) on the basis of a tank model; and
determining the further air volume quantity.

5. The method as recited in claim 4, wherein the tank model maps a combustion chamber and/or an injection chamber of the spark ignition engine at the desired time point ($t_0+\Delta t$).

6. The method as recited in claim 1, wherein the further air volume quantity includes a predicted pressure difference and/or a predicted air-mass flow difference.

7. The method as recited in claim 1, wherein the further air volume quantity is predicted taking into account a characteristics map having fixed and/or variable data, a calculation algorithm, and/or operating state quantities of the spark ignition engine.

8. The method as recited in claim 1, wherein the desired time point ($t_0+\Delta t$) and/or the prediction time point is determined taking into account a speed-dependent time difference ($\Delta t$).

9. The method as recited in claim 1, wherein the air volume is determined for a direct fuel injection combustion chamber.

10. A combustion engine having a control that is adapted for implementing a method according to claim 1.

* * * * *